United States Patent Office.

OLIVER PORTER, OF WATERFORD, MAINE.

Letters Patent No. 109,246, dated November 15, 1870.

IMPROVEMENT IN ROOFING-CEMENT.

The Schedule referred to in these Letters Patent and making part of the same.

*To all whom it may concern:*

Be it known that I, OLIVER PORTER, of Waterford, in the county of Oxford and State of Maine, have invented a new and useful Improvement in Cement for Roofing and other purposes; and I do hereby declare that the following is a full, clear, and exact description thereof, which will enable others skilled in the art to make and use the same.

This invention relates to a new and useful improvement in a cement more especially designed for roofing, but which may be used for other purposes where it is desired to exclude moisture and form a fire-proof surface; and It consists in a composition formed of the ingredients and in the proportions hereinafter named.

The roofing cements which have heretofore been offered to the public have been composed of materials which render them too expensive for the use of people of limited means. With a view of furnishing an article which should come within the reach of all, I have made many experiments, and have discovered that an elastic, durable, water-proof, and fire-proof composition can be formed of materials cheap and common in every section of the country—a composition that hardens readily but remains elastic, and which can be made and applied by any person of ordinary intelligence.

In carrying out my invention and discovery, I make use of the following ingredients in about the proportions named:

For a quantity of the cement sufficient to cover a space ten feet square, I use of sand one quart; common ashes, sifted, two quarts; clay, pulverized, three quarts; linseed oil, three pints; coal-tar, three gallons.

These ingredients are thoroughly mixed together, and may be applied in various ways. It may be applied directly to a wood surface, but for a roof a layer of prepared paper (common roofing paper) is desirable, although by no means indispensable. The coating may be of any desired thickness, and, being tough and elastic, it is not perceptably affected by heat or cold, and is water and fire-proof.

Having thus described my invention,

I claim as new and desire to secure by Letters Patent—

A cement for roofing and other purposes, composed of the ingredients and in about the proportions specified, substantially as and for the purposes set forth.

OLIVER PORTER.

Witnesses:
    ALFRED S. KIMBELL,
    DAVID W. PURINTON.